United States Patent
Ito

(10) Patent No.: US 8,629,993 B2
(45) Date of Patent: Jan. 14, 2014

(54) INFORMATION PROCESSING APPARATUS FOR UPDATING A CHARACTER STRING DISPLAYED ON A PRINT SETTING SCREEN

(75) Inventor: Koji Ito, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 407 days.

(21) Appl. No.: 13/030,459

(22) Filed: Feb. 18, 2011

(65) Prior Publication Data

US 2011/0205584 A1     Aug. 25, 2011

(30) Foreign Application Priority Data

Feb. 24, 2010   (JP) ................................. 2010-039254

(51) Int. Cl.
   *G06F 3/12*        (2006.01)
(52) U.S. Cl.
   USPC ........................................ 358/1.13; 358/1.15
(58) Field of Classification Search
   USPC ................................. 358/1.13, 1.15
   See application file for complete search history.

(56) References Cited

U.S. PATENT DOCUMENTS

2005/0225795 A1*  10/2005  Nuggehalli et al.  ......... 358/1.15
2007/0139686 A1*   6/2007  Nishimi  ....................... 358/1.13

FOREIGN PATENT DOCUMENTS

JP        2007-213366 A       8/2007

* cited by examiner

*Primary Examiner* — Fred Guillermety
(74) *Attorney, Agent, or Firm* — Canon USA Inc. IP Division

(57) ABSTRACT

An information processing apparatus determines whether setting value data corresponding to the identification information of the received printer data is present in a storage unit, stores setting value data containing the identification information, the character string information, and the version information in the storage unit when it is determined that the setting value data corresponding to the identification information of the printer data is not present in the storage unit, and updates the character string information and the version information of the setting value data with those of the printer data when it is determined that the setting value data corresponding to the identification information of the printer data is present in the storage unit, and when the version information of the printer data is newer than that of the setting value data.

4 Claims, 18 Drawing Sheets

| ID | LANGUAGE | CHARACTER STRING | UPDATE VERSION |
|---|---|---|---|
| 1 | JAPANESE | 普通紙 | 1.00 |
| 1 | ENGLISH | Plain Paper | 1.00 |
| 1 | FRENCH | Papier ordinaire | 1.00 |
| 1 | SIMPLIFIED CHINESE | 普通纸 | 1.00 |
| 2 | JAPANESE | プロフォトペーパー | 1.00 |
| 2 | ENGLISH | Photo Paper Pro | 1.00 |
| 2 | FRENCH | Papier Photo Profesionnel | 1.00 |
| 2 | SIMPLIFIED CHINESE | 专业照片纸 | 1.00 |
| 3 | JAPANESE | 写真用紙 光沢ゴールド | 2.00 |
| 3 | ENGLISH | Photo Paper Plus Glossy II | 2.00 |
| 3 | FRENCH | Papier Photo Glacé Extra II | 2.00 |
| 3 | SIMPLIFIED CHINESE | 高级光面照片纸 II | 2.10 |
| 4 | JAPANESE | 写真用紙 光沢プロ | 2.00 |
| 4 | ENGLISH | Photo Paper Pro II | 2.00 |
| 4 | FRENCH | Papier Photo Profesionnel II | 2.00 |
| 4 | SIMPLIFIED CHINESE | 专业照片纸 II | 2.10 |

FIG.4

| ID | SETTING ITEM |
|---|---|
| 1 | SHEET TYPE |
| 2 | SHEET SIZE |
| 3 | NO-EDGE SETTING |

FIG.5A

| CONVERSION PROCESSING TYPE | ID | CHARACTER STRING | UPDATE VERSION |
|---|---|---|---|
| A | 1 | PLAIN PAPER | 1.00 |
| B | 2 | PRO PHOTO PAPER | 1.00 |
| C | 3 | GLOSSY GOLD | 1.00 |

FIG.5B

| ID | CHARACTER STRING | UPDATE VERSION |
|---|---|---|
| 1 | LETTER | 1.00 |
| 2 | A4 | 1.00 |
| 3 | A5 | 1.00 |
| 4 | A3 | 1.00 |
| 5 | POSTCARD | 1.00 |

FIG.5C

| ID | CHARACTER STRING | UPDATE VERSION |
|---|---|---|
| 1 | THERE IS EDGE | 1.00 |
| 2 | NO EDGE | 1.00 |

FIG.6A

| SETTING ITEM |
|---|
| 1 |
| ID |
| 1 |
| 2 |
| 3 |

FIG.6B

| SETTING ITEM |
|---|
| 2 |
| ID |
| 2 |
| 3 |
| 5 |

FIG.6C

| SETTING ITEM |
|---|
| 3 |
| ID |
| 1 |
| 2 |

FIG.9A

| VERSION 1.00 | | |
|---|---|---|
| CONVERSION PROCESSING TYPE | ID | CHARACTER STRING |
| A | 1 | PLAIN PAPER |
| B | 2 | PRO PHOTO PAPER |
| C | 3 | GLOSSY GOLD |

FIG.9B

| VERSION 1.10 | | |
|---|---|---|
| CONVERSION PROCESSING TYPE | ID | CHARACTER STRING |
| A | 1 | PLAIN PAPER |
| B | 2 | PRO PHOTO PAPER |
| C | 3 | PHOTO PAPER GLOSSY GOLD |

FIG.9C

| VERSION 2.00 | | |
|---|---|---|
| CONVERSION PROCESSING TYPE | ID | CHARACTER STRING |
| A | 1 | PLAIN PAPER |
| C | 3 | PHOTO PAPER GLOSSY GOLD |
| C | 4 | PHOTO PAPER GLOSSY PRO |

FIG.12

| CONVERSION PROCESSING TYPE | ID | CHARACTER STRING | UPDATE VERSION |
|---|---|---|---|
| A | 1 | PLAIN PAPER | 1.00 |
| B | 2 | PRO PHOTO PAPER | 1.00 |
| C | 3 | PHOTO PAPER GLOSSY GOLD | 1.10 |
| C | 4 | PHOTO PAPER GLOSSY PRO | 2.00 |

FIG.16A

| CONVERSION PROCESSING TYPE | ID |
|---|---|
| A | 1 |
| B | 2 |
| C | 3 |

FIG.16B

| ID | LANGUAGE | CHARACTER STRING | UPDATE VERSION |
|---|---|---|---|
| 1 | JAPANESE | 普通紙 | 1.00 |
| 1 | ENGLISH | Plain Paper | 1.00 |
| 1 | FRENCH | Papier ordinaire | 1.00 |
| 1 | SIMPLIFIED CHINESE | 普通纸 | 1.00 |
| 2 | JAPANESE | プロフォトペーパー | 1.00 |
| 2 | ENGLISH | Photo Paper Pro | 1.00 |
| 2 | FRENCH | Papier Photo Profesionnel | 1.00 |
| 2 | SIMPLIFIED CHINESE | 专业照片纸 | 1.00 |
| 3 | JAPANESE | 光沢ゴールド | 1.00 |
| 3 | ENGLISH | Glossy II | 1.00 |
| 3 | FRENCH | Glacé Extra II | 1.00 |
| 3 | SIMPLIFIED CHINESE | 光面照片纸 II | 1.00 |

FIG.17A

VERSION 2.00

| CONVERSION PROCESSING TYPE | ID | JAPANESE CHARACTER STRING | ENGLISH CHARACTER STRING | FRENCH CHARACTER STRING |
|---|---|---|---|---|
| A | 1 | 普通紙 | Plain Paper | Papier ordinaire |
| C | 3 | 写真用紙 光沢ゴールド | Photo Paper Plus Glossy II | Photo Paper Plus Glossy II |
| C | 4 | 写真用紙 光沢プロ | Photo Paper Pro II | Papier Photo Profesionnel II |

FIG.17B

VERSION 2.10

| CONVERSION PROCESSING TYPE | ID | JAPANESE CHARACTER STRING | ENGLISH CHARACTER STRING | CHINESE CHARACTER STRING |
|---|---|---|---|---|
| A | 1 | 普通紙 | Plain Paper | 普通纸 |
| C | 3 | 写真用紙 光沢ゴールド | Photo Paper Plus Glossy II | 高级光面照片纸 II |
| C | 4 | 写真用紙 光沢プロ | Photo Paper Pro II | 专业照片纸 II |

FIG.18

| ID | LANGUAGE | CHARACTER STRING | UPDATE VERSION |
|---|---|---|---|
| 1 | JAPANESE | 普通紙 | 1.00 |
| 1 | ENGLISH | Plain Paper | 1.00 |
| 1 | FRENCH | Papier ordinaire | 1.00 |
| 1 | SIMPLIFIED CHINESE | 普通纸 | 1.00 |
| 2 | JAPANESE | プロフォトペーパー | 1.00 |
| 2 | ENGLISH | Photo Paper Pro | 1.00 |
| 2 | FRENCH | Papier Photo Profesionnel | 1.00 |
| 2 | SIMPLIFIED CHINESE | 专业照片纸 | 1.00 |
| 3 | JAPANESE | 写真用紙 光沢ゴールド | 2.00 |
| 3 | ENGLISH | Photo Paper Plus Glossy II | 2.00 |
| 3 | FRENCH | Papier Photo Glacé Extra II | 2.00 |
| 3 | SIMPLIFIED CHINESE | 高级光面照片纸 II | 2.10 |
| 4 | JAPANESE | 写真用紙 光沢プロ | 2.00 |
| 4 | ENGLISH | Photo Paper Pro II | 2.00 |
| 4 | FRENCH | Papier Photo Profesionnel II | 2.00 |
| 4 | SIMPLIFIED CHINESE | 专业照片纸 II | 2.10 |

United States Patent US 8,629,993 B2

INFORMATION PROCESSING APPARATUS FOR UPDATING A CHARACTER STRING DISPLAYED ON A PRINT SETTING SCREEN

BACKGROUND OF THE INVENTION

1. Field of the Invention

The present invention relates to an information processing apparatus, an information processing method, and a storage medium.

2. Description of the Related Art

As conventionally practiced, a printer driver installed in an external apparatus such as a personal computer connected to a printer converts image data into data (print data) printable by the printer based on print setting set by a user. The printer driver then realizes printing by transmitting the converted print data to the printer.

In another form, the printer driver receives a setting value such as "sheet type" or "sheet size" input by the user, and performs only image data transmission to the printer, and the printer side converts the image data into print data. The conversion of the image data into the print data includes processing dependent on the printer such as color conversion of red, green and blue (RGB) data processed by the computer into cyan, magenta, yellow and black (CMYK) data to be processed by the printer or quantization processing for conversion into a gradation number reproducible by the printer. Thus, a printer driver not dependent on a printer model can support many printers by the same program. Hereinafter, the printer driver of this type is referred to as a model-nondependent printer driver.

In many cases, the model-nondependent printer driver is employed for a printer as a built-in device. It is because the built-in device is lower in storage capacity or performance of a central processing unit (CPU) compared with the personal computer, therefore fast conversion of the image data into the print data that requires many processes is difficult to be achieved. The model-nondependent printer driver manages a character string to be displayed on a print setting screen on a table (setting value information management table) in association with an ID. The model-nondependent printer driver acquires a usable setting item (such as a sheet size) from a printer scheduled to perform printing, as an ID, and displays a character string corresponding to the acquired ID on the print setting screen. Thus, when the character string is not stored corresponding to the ID acquired from the printer which is to perform printing, no setting item can be displayed on the print setting screen.

Updating the setting value information management table can solve the problem. However, in the case of the printer driver installed in the built-in device, different from the printer driver installed in the personal computer, updating via Internet is difficult. Thus, the printer driver communicates with a printer which can communicate with the driver, acquires capability information of the printer in a form where an ID and a character string correspond to each other, from the printer, and adds the acquired information when the acquired information has not been defined on the setting value information management table. Japanese Patent Application Laid-Open No. 2007-213366 discusses a technology for updating such a setting value information management table.

However, in the conventional technology, even when updating is performed to add "character string" to the setting value information management table, the "character string" is just added, while the "character string" that has been stored is not changed. Consequently, the setting value information management table cannot be updated more appropriately. For example, when a name of a sheet type displayed on the print setting screen is changed, a name of a purchased sheet is different from the character string displayed on the print setting screen, and hence the user cannot determine which sheet to select.

SUMMARY OF THE INVENTION

The present invention is directed to more appropriately updating a character string displayed on a print setting screen.

According to an aspect of the present invention, an information processing apparatus includes: a determination unit configured to determine, when printer data associating together identification information to identify a setting value on a print setting screen, character string information indicating a character string corresponding to the setting value displayed on the print setting screen, and version information indicating an old/new state of the character string information is received from a printer permitted to communicate, whether setting value data corresponding to the identification information of the received printer data is present in a storage unit; a storage unit configured to store, when the determination unit determines that the setting value data corresponding to the identification information of the printer data is not present in the storage unit, setting value data containing the identification information, the character string information, and the version information in the storage unit; and an update unit configured to update, when the determination unit determines that the setting value data corresponding to the identification information of the printer data is present in the storage unit, and when the version information of the printer data is newer than that of the setting value data, the character string information and the version information of the setting value data with those of the printer data.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an example of a setting item table.

FIGS. 5A to 5C illustrate examples of setting value information management tables.

FIGS. 6A to 6C illustrate examples of setting items and setting values.

FIGS. 9A to 9C illustrate examples of printer setting value information tables.

FIG. 12 illustrates an example of a setting value information management table after updating.

FIGS. 16A and 16B illustrate examples of setting value information management tables.

FIGS. 17A and 17B illustrate examples of printer setting value information tables.

FIG. 18 illustrates an example of a setting value information management table after updating.

DESCRIPTION OF THE EMBODIMENTS

Various exemplary embodiments, features, and aspects of the invention will be described in detail below with reference to the drawings.

Exemplary embodiments of the present invention are described with reference to the drawings.

Figure 1:
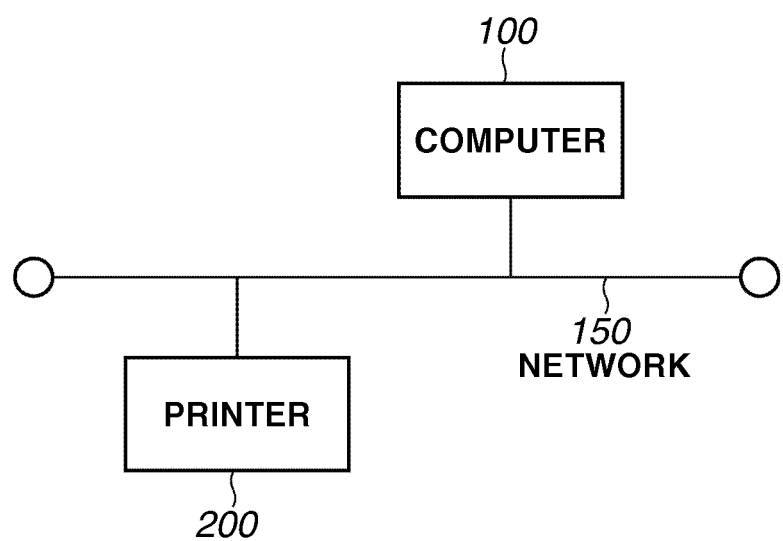
FIG. 1 illustrates an example of a configuration of a printing system.

FIG. 1 illustrates a configuration of a printing system according to a first exemplary embodiment of the present invention. The printing system includes a computer 100 and a printer 200. The computer 100 and the printer 200 are examples of network devices, and connected to a network 150. It is presumed that each network device is engaged in communication according to a transmission control protocol (TCP)/Internet protocol (IP). The present exemplary embodiment is described by taking an example where the computer 100 and the printer 200 are interconnected via the network 150. However, the exemplary embodiment can also employ a configuration where the computer and the printer are interconnected via a universal serial bus to communicate with each other.

Figure 2:
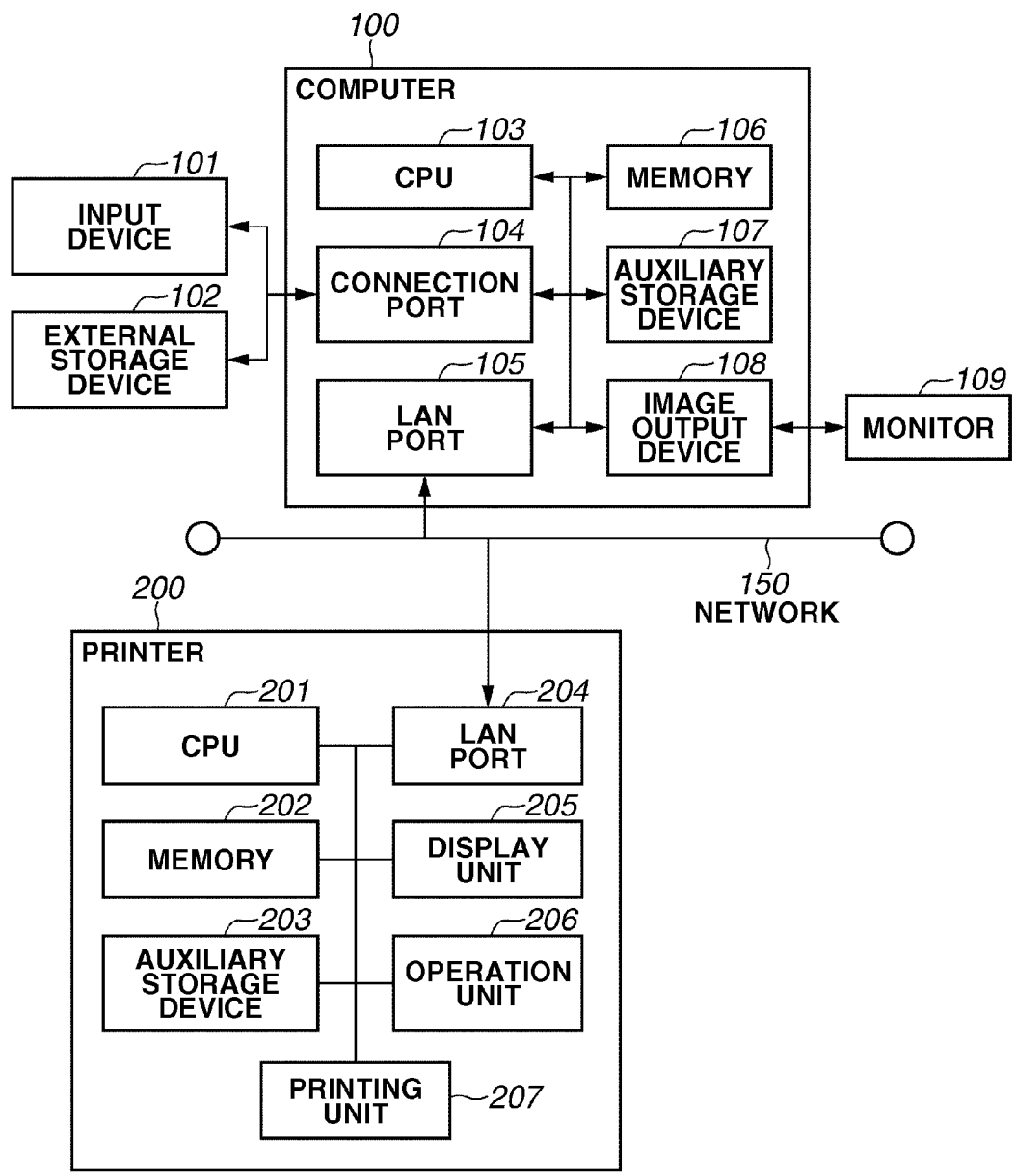
FIG. 2 illustrates an example of a hardware configuration of a computer and a printer.

FIG. 2 illustrates a hardware configuration of the computer 100 and the printer 200. The computer 100 is an example of an information processing apparatus, and includes a CPU 103, a connection port 104 such as a serial port or a USB port for connecting a peripheral device, and a local area network (LAN) port 105 for connection to a network. The computer 100 further includes a memory 106, an auxiliary storage device 107 such as a hard disk, and an image output device 108 such as a video card for outputting an image to a screen.

The memory 106 is a random access memory for spreading out a work area for the CPU 103. The auxiliary storage device 107 is an example of a storage unit, and stores various control programs such as a printer driver and applications described below, and a setting value information management table described below. An input device 101 such as a keyboard or a mouse, and an external storage device 102 such as a USB memory, an external hard disk, a compact disc-read only memory (CD-ROM) or a digital versatile disc (DVD)-ROM are connected to the connection port 104 such as a serial advanced technology attachment (SATA) port or USB port. A monitor 109 is connected to an output terminal of an image output device 108. The LAN port 105 is connected to the network 105.

The printer 200 includes a CPU 201, a memory 202, an auxiliary storage device 203 such as a hard disk, and a LAN port 204 for connection to the network 150. The printer 200 further includes an operation unit that allows a user to operate a main body of the printer 200, a display unit 205 that provides a user with interface (UI) based on an operation performed by the operation unit 206 or an operation status of the printer 200, and a printing unit 207.

The printing unit 207 performs printing to form an image on a print medium based on print data generated in the printer 200. In a printer such as an ink jet printer to which the present exemplary embodiment can be applied, optimal print data must be supplied to the printing unit 207 according to a type of a print medium on which an image is formed. The print data is generated by executing, by the CPU 201, a data conversion program stored in the auxiliary storage device 203 based on image data such as RGB data transmitted from the computer 100 via the network and setting such as a print medium size or a sheet size.

The memory 202 is used as a data conversion work area. The auxiliary storage device 203 stores information on a setting item or a setting value of the printer 200 described below, which is transmitted from the printer 200 to the computer 100 via the network 150.

Figure 3:
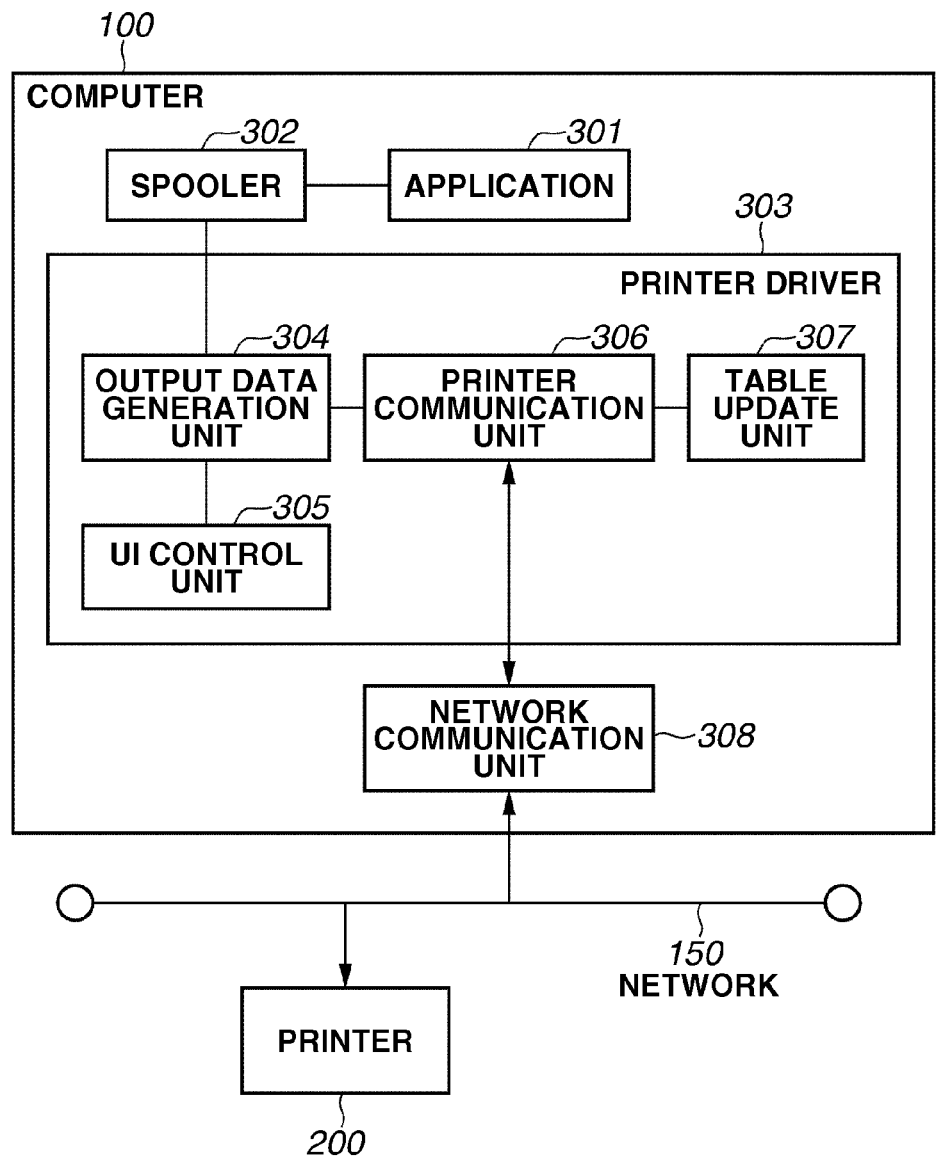
FIG. 3 illustrates an example of a software configuration of the computer.

FIG. 3 illustrates a software configuration of the computer 100. The computer 100 includes an application 301, a spooler 302, a printer driver 303, and a network communication unit 308. These software programs are stored in the auxiliary storage device 107, and called up to the memory 106 to be executed by the CPU 103. In other words, the CPU 103 performs processing according to a procedure of the program stored in the auxiliary storage device 106, thereby realizing functions and processing relating to a flowchart described below in the computer 100.

The spooler 302 is provided as a part of an operating system (OS) used in the computer 100, and feeds an output from the application 301 to the printer driver 303.

The printer driver 303 includes an output data generation unit 304, a UI control unit 305, a printer communication unit 306, and a table update unit 307. The output data generation unit 304 generates data to be transmitted to the printer 200 based on image data received from the spooler 302 and print setting received from the UI control unit 305. In the printer driver 303 to which the present exemplary embodiment can be applied, conversion of image data into print data of a format printable at the printing unit 207 of the printer 200 is performed not by the printer driver 303 but within the printer 200. The UI control unit 305 displays and controls a print setting dialog that assists the user to perform print setting for the printer 200. The table update unit 307 updates the setting value information management table (described below) stored in the auxiliary storage device 107 and used for displaying the print setting dialog. The printer communication unit 306 acquires various data from the printer 200 via the network communication unit 308 from the network 150. The data acquired from the printer 200 are described below. The printer communication unit 306 transmits various data to the printer 200 via the network communication unit 308 and the network 150.

FIG. 4 illustrates an example of a setting item table on correspondence between IDs and setting items of the printer 200. The setting item table is managed (held) by the printer driver 303. The IDs corresponding to the setting items are predefined as agreed items between the printer 200 and the printer driver 303. The IDs are used for exchanges between the printer 200 and the printer driver 303. In the present printing system, setting items of "sheet type", "sheet size", and "no-edge setting" can be set by the printer driver 303.

FIG. 5A illustrates an example of a setting value information management table relating to "sheet type". FIG. 5B illustrates an example of a setting value information management table relating to "sheet size". FIG. 5C illustrates an example of a setting value information management table relating to "no-edge setting".

The setting value information management table is an example of setting value data. The setting value information management table basically contains "ID" of a setting value settable in the setting item, "character string" used for displaying setting on a print setting screen, and "update version". The "ID" is an example of identification information to identify a setting value, and the "character string" is an example of character string information indicating a character string corresponding to the setting value displayed on the print setting screen. The "update version" is an example of version information indicating old/new character string information, specifically a version of a printer setting value information table used for updating the "character string" and stored in the printer 200. The printer setting value information table is described in detail below.

For initial values of the "character string" and the "update version", the same information as that of the printer setting value information table held in the printer manufactured simultaneously when the printer driver 303 is created, is set. The printer driver 303 acquires "ID" of a setting value from the printer designated by the user, and displays corresponding "character string" on the print setting screen.

The setting value information management table relating to the "sheet size" contains "conversion processing type" in addition to the "ID", "character string", and the "update version". The "conversion processing type" is an example of conversion processing type information indicating a type of conversion of image data into print data performed by the printer 200. Even while a setting value of the "sheet type" transmitted from the printer driver 303 to the printer 200 is different, when the "conversion processing type" is the same, conversion of image data into print data such as color conversion or quantization performed in the printer 200 is the same. The "sheet type" indicates a type of a print medium to form an image in the printer 200.

FIGS. 6A to 6C illustrate examples of setting items and setting values acquired from the printer 200 by the printer driver 303. In FIG. 6A, the printer 200 supports "plain paper", "pro photo paper", and "glossy paper" as setting items in the setting item "sheet type" by referring to FIG. 4 and FIGS. 5A to 5C. Similarly, in FIG. 6B, the printer 200 supports "A4", "A5", and "postcard" as setting items in the setting item "sheet size". Similarly, in FIG. 6C, the printer 200 supports "there is edge" and "no edge" as setting items in the setting item "no-edge setting".

Figure 7A:
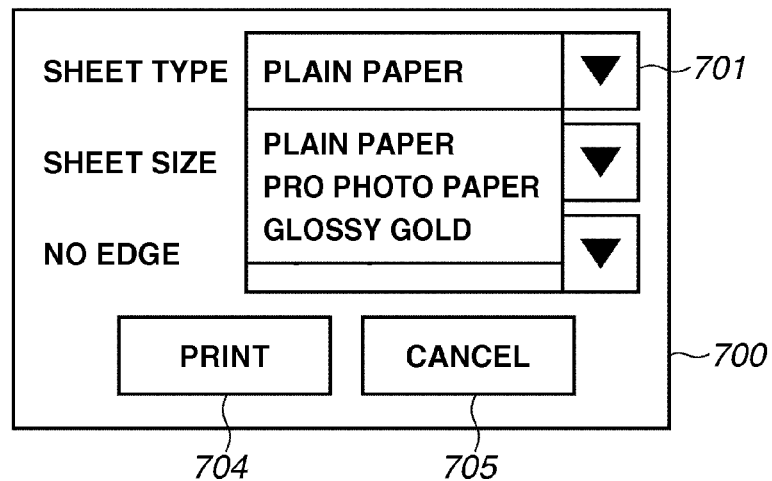
FIGS. 7A to 7C illustrate examples of print setting dialogs.
Figure 7B:
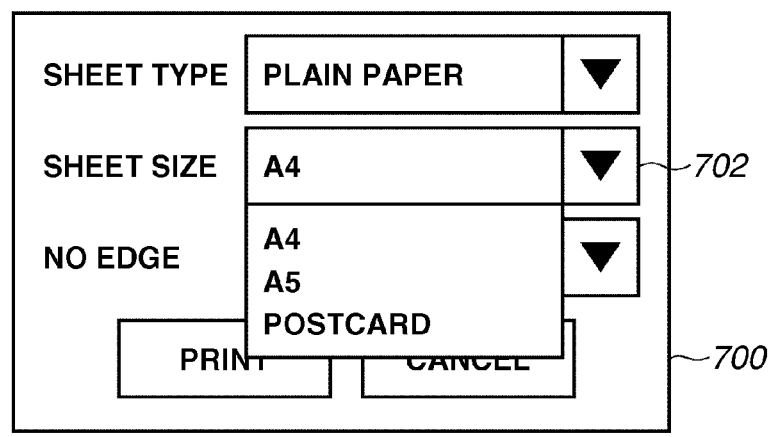
Figure 7C:
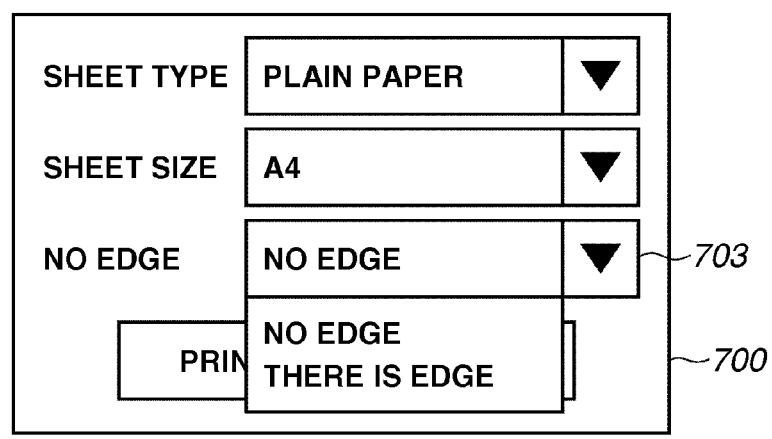

FIGS. 7A to 7C illustrate examples of print setting dialogs (print setting dialogs 700) used by the user to set setting values. The print setting dialog 700 includes a sheet type list display unit 701, a sheet size list display unit 702, a no-edge print setting list display unit 703, a print execute button 704, and a cancel button 705. The sheet type list display unit 701 displays a list of settable sheet type. The sheet size list display unit 702 displays a list of settable sheet sizes. The no-edge print setting list display unit 703 displays a list of settings relating to no-edge printing.

The sheet type list display unit 701, the sheet size list display unit 702, and the no-edge print setting list display unit 703 are configured as drop-down lists. When the user clicks a right edge of the display unit with a mouse, a list of setting values is displayed in a list box. When the user selects a value from the list of setting values, only the selected value is displayed. In FIG. 7A, the user can select "plain paper", "pro photo paper", or "glossy paper" as a setting value in the setting item "sheet type". In FIG. 7B, the user can select "A4", "A5", or "postcard" as a setting value in the setting item "sheet size". In FIG. 7C, the user can select "there is edge" or "no edge" as a setting value in the setting item "no-edge printing".

Figure 8:
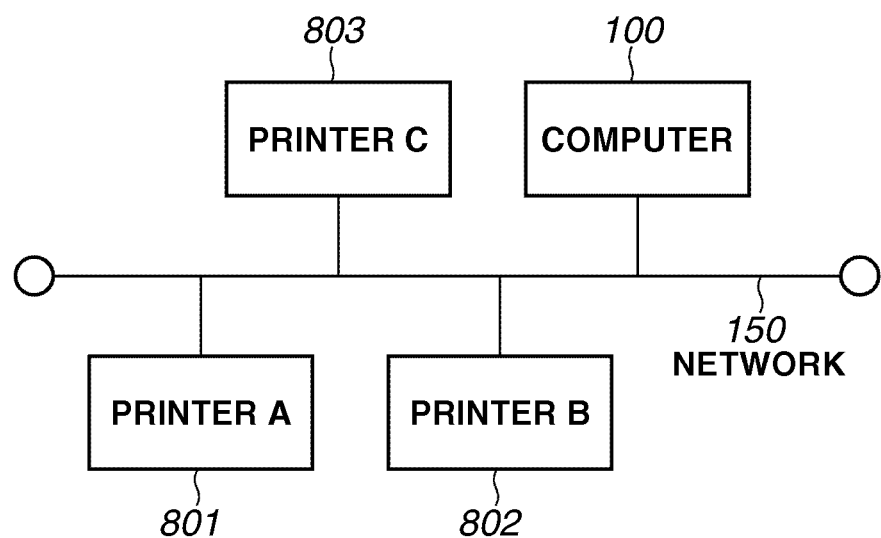
FIG. 8 illustrates an example of a configuration of a printing system.

FIG. 8 illustrates a configuration where a printer A801, a printer B802, and a printer C803 similar in configuration to the printer 200, and the computer 100 are connected to the network 150.

FIGS. 9A to 9C illustrate examples of printer setting value information tables relating to the "sheet type". The printer setting value information table is stored in the auxiliary storage device 203 in the printer. The printer setting value information table includes "ID" of a setting value, and "character string" and "conversion processing type" used for displaying a print setting dialog by the printer driver 303. The printer setting value information table stores all pieces of information about the "sheet type" supported by the printer that stores the printer setting value information table. A version is set in the printer setting value information table. The version is used as an update condition for updating a setting value information management table stored by the printer driver 303 described below. In other words, the printer setting value information table is an example of printer data configured by associating together "ID", "character string", and "update version" (or "ID", "character string", "conversion processing type", and "update version").

Each of the printer A801, the printer B802, and the printer C803 transmits information about the printer setting value information table in response to a request from the printer driver 303. Printer setting value information tables relating to the "sheet size" and the "no-edge printing" are different from the printer setting value information table relating to the "no-edge printing" only in that there is no "conversion processing type". Others are similar, and thus description is omitted.

FIG. 9A illustrates a printer setting value information table stored by the printer A801. FIG. 9B illustrates a printer setting value information table stored by the printer B802. FIG. 9C illustrates a printer setting value information table stored by the printer C803. The printer A801 supports "plain paper", "pro photo paper", and "glossy gold" as sheet types. The printer B802 supports "plain paper", "pro photo paper", and "photo paper glossy gold" as sheet types. The printer C803 supports "plain paper", "photo paper glossy gold", and "photo paper glossy pro" as sheet types.

Information at the time of printer manufacturing is applied to the printer setting value information table. The version information included in the printer setting value information table indicates that the newer a printer, the larger a numerical value. The printer B802 of a version "1.10" is newer than the printer A801 of a version "1.00", and a character string with respect to ID "3" has been updated from "glossy gold" to "photo paper glossy gold". The printer C803 of a version "2.00" supports "photo paper glossy pro" not present in the printers A801 and B802.

Figure 10:
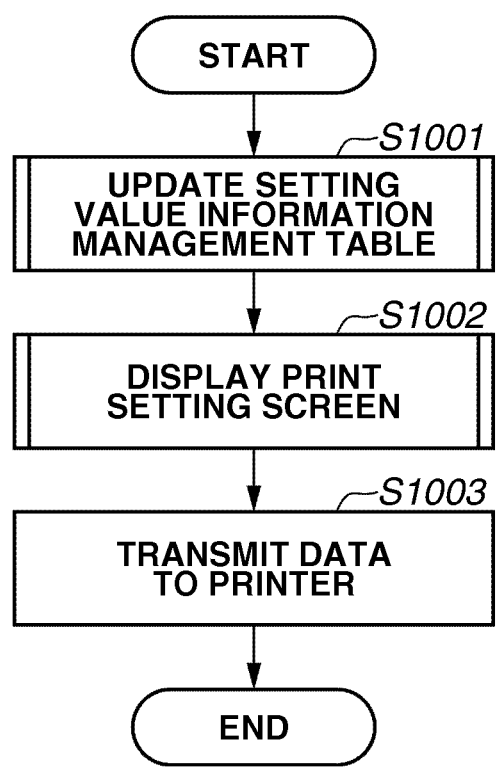
FIG. 10 is a flowchart illustrating an example of printing.

Referring to FIG. 10, printing performed by the printer B801 in the network configuration illustrated in FIG. 8 is described. FIG. 10 is an example of a flowchart illustrating printing performed by the printer driver 303. The computer 100 generates data to be printed by the application 301, and then activates the printer driver 303 to set the printer A801.

In step S1001, when activated, the printer driver 303 acquires printer setting value information tables from printers connected to the network 150 which can communicate with the driver (in the present exemplary embodiment, printers A801, B802, and C803). The printer driver 303 updates a setting value information management table of its own. As an example of updating of the setting value information management table, updating of a setting value information management table relating to "sheet type" is described referring to FIG. 11.

In step S1002, the printer driver 303 displays print setting screen. The print setting screen displaying is described in detail below referring to FIG. 13. In step S1003, the printer driver 303 transmits the data to the printer A801 to end the printing. The present exemplary embodiment is described by taking the example of updating the setting value information management table at the time when the user activates the printer driver. However, the setting value information management table can also be updated at predetermined time.

Figure 11:
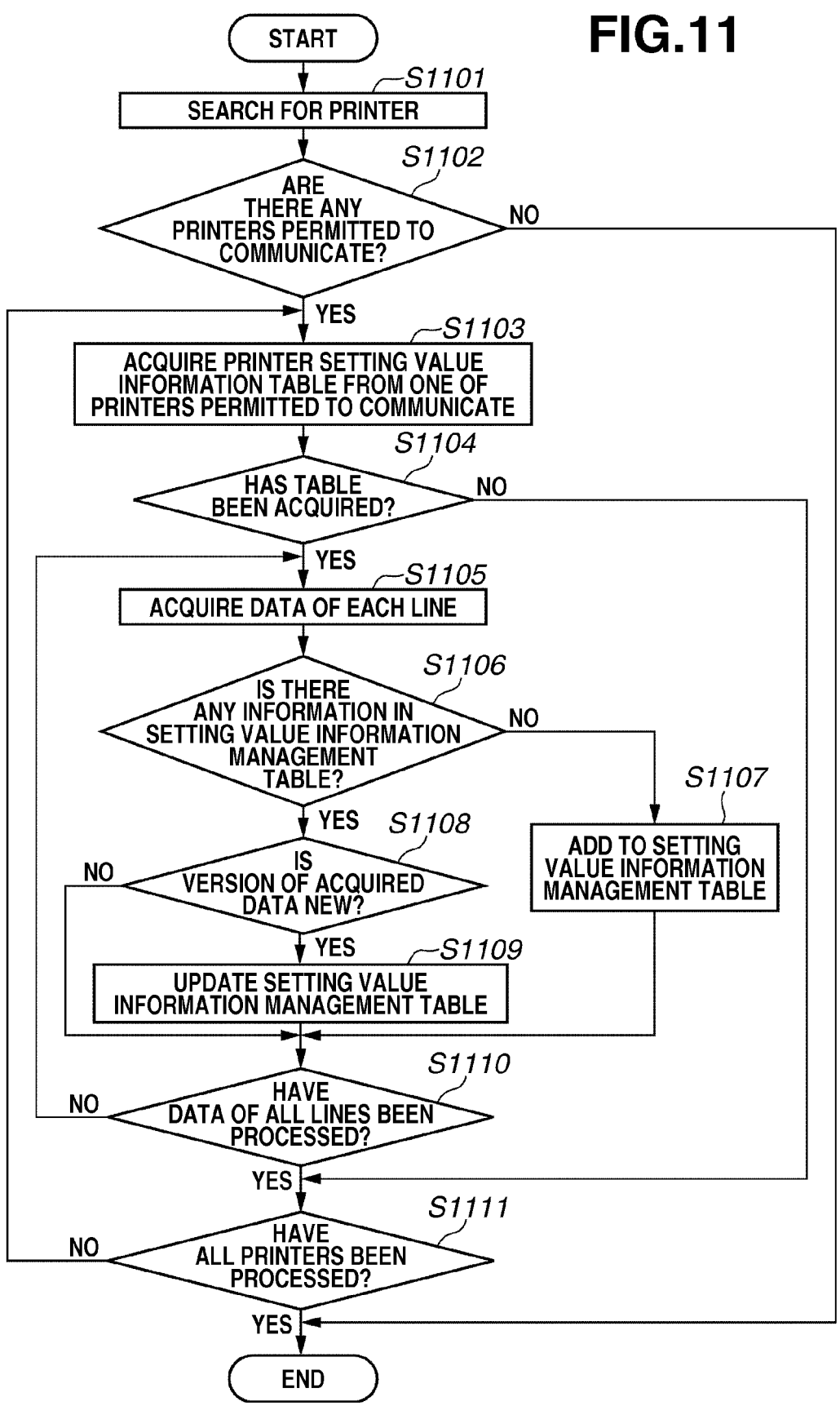
FIG. 11 is a flowchart illustrating an example of setting value information management table updating.

Referring to FIG. 11, updating of the setting value information management table relating to the "sheet type" is described. FIG. 11 is an example of a flowchart illustrating updating performed by the printer driver 303. In step S1101, the printer communication unit 306 of the printer driver 303 searches for printers present in the network 150 via the network communication unit 308. When it is determined that there is no printer which can communicate (NO in step S1102), the table update unit 307 ends the updating of the setting value information management table. On the other hand, when it is determined that there are printers which can communicate (YES in step S1102), the table update unit 307 executes processing of step S1103.

In step S1103, the table update unit 307 acquires a setting value information table from one of the listed printers. The table update unit 307 executes processing of step S1111 when it is determined that the printer setting value information table cannot be acquired (NO in step S1104), and executes processing of step S1105 when it is determined that the printer setting value information table can be acquired (YES in step S1104).

In step S1105, the table update unit 307 acquires data of one line of the printer setting value information table acquired in step S1103. The table update unit 307 executes processing of step S1107 when it is determined that there is no setting value corresponding to "ID" of the acquired data in the setting value information management table (NO in step S1106). On the other hand, when it is determined that there is a setting value (YES in step S1106), the table update unit 307 executes processing of step S1108.

In step S1107, the table update unit 307 adds the acquired data of one line and a version added to the printer setting value information table, to the setting value information management table, and the processing proceeds to step S1110. In step S1108, the table update unit 307 compares the version added to the printer setting value information table acquired in step S1103 with "update version" of the setting value present in the setting value information management table corresponding to the "ID" of the acquired data. When it is determined that the former is newer (YES in step S1108), in step S1109, the table update unit 307 updates the "character string" and the "update version" of the setting value information management table with those of the acquired data, and the processing proceeds to step S1110. On the other hand, when it is determined that both are similar or the latter is newer, the processing proceeds to step S1110.

In step S1110, the table update unit 307 checks whether all data of the printer setting value information tables have been processed. When it is determined that there is data yet to be processed (NO in step S1110), the table update unit 307 executes processing of step S1105 again. When it is determined that all the data have been processed (YES in step S1110), the processing proceeds to step S1111. In step S1111, the table update unit 307 checks whether all the printers of the list created in step S1101 have been processed. When it is determined that there is a printer yet to be processed (NO in step S1111), the table update unit 307 executes processing of step S1103 again. When it is determined that all the printers have been processed (YES in step S1111), the updating of the setting value information management table is ended.

Updating of the setting value information management tables relating to the "sheet size" and the "no-edge printing" is similar to that of the "sheet type", and thus description thereof is omitted.

The present exemplary embodiment acquires the printer setting value information tables for all the printers which can communicate. However, the present invention is not limited to this configuration. For example, a media access control (MAC) address of a printer can be stored for the printer used for updating in the past. For a printer having the same MAC address as that stored during the printer searching in step S1101, no communication needs to be performed to update the setting value information management table. For example, a configuration can be employed where a switch (not illustrated) is provided in the print setting dialog 700 of the printer driver 303, and the user can select whether to update the "character string" displayed in the print setting dialog 700.

FIG. 12 illustrates a setting value information management table updated by using the printer setting value information tables illustrated in FIGS. 9A to 9C, which have been acquired from the printer A801, the printer B802, and the printer C803 by the computer 100 through communication with the computers. As compared with FIG. 5A illustrating the status before updating, the "glossy gold" for ID "3" has been updated to "photo paper glossy gold" on the printer setting value information table illustrated in FIG. 9B. A sheet type of ID "4" has been added according to the printer setting value information table illustrated in FIG. 9C.

Figure 13:
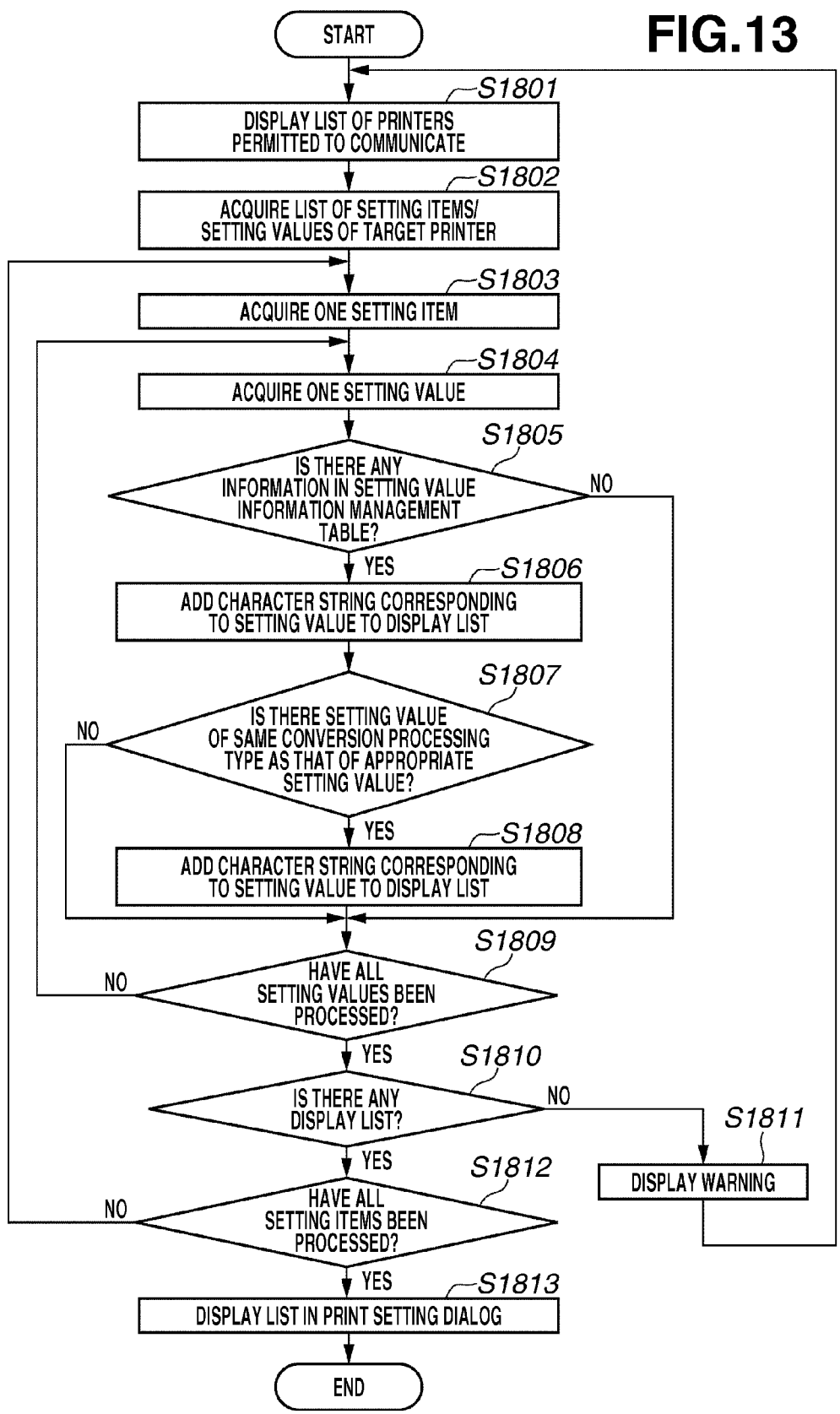
FIG. 13 is a flowchart illustrating an example of print setting screen display.

Next, referring to FIG. 13, print setting screen display is described. FIG. 13 is an example of a flowchart illustrating the print setting screen display. First, in step S1801, the UI control unit 305 of the printer driver 303 displays a dialog that assists the user to select a printer from the list of printers which can communicate, the list acquired during the updating of the setting value information management table. The printer selection dialog is not illustrated. The user selects a printer to perform printing from the displayed list of printers (user's print setting operation via the operation unit).

In step 1802, the UI control unit 305 communicates with the printer selected in step S1801 via the printer communication unit 306, and acquires lists of setting items and setting values settable by the printer. In step S1803, the UI control unit 305 acquires a list of setting values relating to one setting item from the lists of setting items and setting values acquired in step S1802. In step S1804, the UI control unit 305 acquires "ID" of one setting value from the list of setting values acquired in step S1803. In step S1805, the UI control unit 305 checks whether there is "character string" corresponding to the acquired ID of the setting value in the setting value information management table. When the UI control unit 305 determines that there is no "character string" (NO in step S1805), the processing proceeds to step S1809. When there is "character string" (YES in step S1805), the processing proceeds to step S1806.

In step S1806, the UI control unit 305 adds the "character string" corresponding to the acquired "ID" of the setting value to a display list to be displayed in the print setting dialog 700. In step S1807, the UI control unit 305 checks whether there is "ID" having the same setting value as that of "conversion processing type" of the "ID" corresponding to the "character string" added in step S1806 in the setting value information management table. When the UI control unit 305 determines that there is "ID" (YES in step S1807), the processing proceeds to step S1808. When there is no "ID" (NO in step S1807), the processing proceeds to step S1809. In step S1808, the UI control unit 305 adds a character string corresponding to the "ID" of the setting value determined to be present, to the display list. When a setting item to be processed is other than "sheet type", there is no information on "conversion processing type", and hence steps S1807 and S1808 are omitted.

In step S1809, the UI control unit 305 checks whether "IDs" of all setting values have been processed. When the UI control unit 305 determines that there are still IDs to be processed (No in step S1809), the processing returns to step S1804. When all the IDs have been processed (YES in step S1809), the processing proceeds to step S1810. In step S1810, the UI control unit 305 checks whether there is "character string" in the display list. When there is no character string (NO in step S1810), the processing proceeds to step S1811. When there is a character string (YES in step S1810), the processing proceeds to step S1812. In step S1811, the UI control unit 305 displays a warning message such as "selected printer cannot print, select printer again", and the processing returns to step S1801.

In step S1812, the UI control unit 305 checks whether all setting items have been processed. When the UI control unit 305 determines that there are still setting items to be processed (NO in step S1812), the processing returns to step S1803. When all the setting items have been processed (YES in step S1812), the processing proceeds to step S1813. In step S1813, the UI control unit 305 displays the display list of all the setting items in the print setting dialog 700, and ends the print setting screen display.

Figure 14:
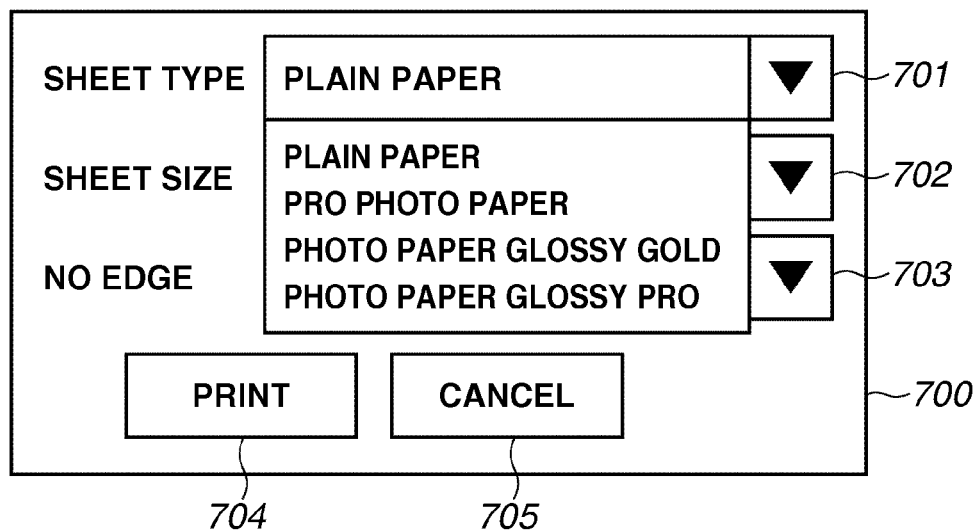
FIG. 14 illustrates an example of a print setting dialog after setting value information management table updating.

FIG. 14 illustrates a print setting dialog 700 displayed when printing is performed at the printer A801 where the setting items and the setting values illustrated in FIG. 6A can be set. In the setting item of "sheet type", setting values settable in the printer A801, i.e., "plain paper", "pro photo paper", "photo paper glossy gold", and "photo paper glossy pro" which is the same "conversion processing type" as that of the "photo paper glossy gold", are displayed.

The user selects desired setting in the print setting dialog 700, and then presses the print execute button 704. In step S1003, after the print execute button has been pressed, the output data generation unit 304 of the printer driver 303 transmits a setting value of each setting item selected in the print setting dialog 700 and image data via the printer communication unit 306. When the setting value selected in the print setting dialog 700 can be set at the printer A801 that performs printing, the setting value is directly transmitted to the printer A801.

In the present exemplary embodiment, when a setting value such as "photo paper glossy pro" unsettable at the printer A801 that performs printing, is selected, the setting value is replaced by a settable setting value of "photo paper glossy gold", and transmitted to the printer A801. The setting value is replaced by the following procedure. First, the UI control unit 305 checks whether "ID" of the setting value selected in the print setting dialog 700 is present among setting values received from the printer A801. When not present, the UI control unit 305 searches for a setting value of "conversion processing type" equal to the selected setting value in the setting value information management table, and determines a setting value.

The UI control unit 305 then checks whether "ID" of the determined setting value is present among the setting values received from the printer A801. When present, the setting value is replaced. During displaying of the setting value in the print setting dialog 700, the equal setting value of the "conversion processing type" is displayed based on the setting values received from the printer A801. Thus, replacement is never impossible. The printer A801 generates print data based on the image data received from the printer driver 303 and the setting values of the setting items of "sheet type", "sheet size", and "no-edge setting", and performs printing at the printing unit 207.

Even in a conventional method, when "character string" corresponding to "ID" of a setting value is different, a character string in a setting value information management table can be updated when determining that the character string has been updated. However, in the conventional method, whether the "character string" present in the setting value information management table or "character string" acquired from a printer should be displayed cannot be determined. Consequently, the "character string" of the setting value information management table cannot be accurately updated. On the other hand, in the present exemplary embodiment, the "version" of the printer setting value information table of the printer is compared with the "update version" of the setting value of the setting value information management table, and the "character string" and the "update version" corresponding to the "ID" of the setting value are updated. This configuration enables updating a content of the character string displayed on the print setting screen to a newest state.

Not only the "character string" corresponding to the "ID" of the setting value acquired from the printer but also "character string" of "ID" of another setting item associated with the "ID" of the setting value may be displayed on the print setting screen. For example, when an old printer performs printing on a sheet type manufactured after the printer, the printer must perform printing based on current sheet type setting as an alternative. However, conventionally, the printer returns only "ID" of a sheet type that the printer supports to the printer driver, and the printer driver displays only the current sheet type on the printer setting screen. Consequently, the user is at a loss as to which sheet type to select in the old printer.

Thus, in the present exemplary embodiment, when an existing sheet type not supported by the printer is displayed on the print setting screen of the printer driver, and the user selects the existing sheet type, the printer driver internally replaces a setting value of the sheet type by that supported by the printer. This configuration enables the user to select the existing sheet type not supported by the printer. Thus, when performing printing by the old printer, the user can select a sheet type on the print setting screen more easily.

The first exemplary embodiment has been described by the example using Japanese for the "character string" displayed by the printer driver 303, the "character string" displayed in the setting value information management table, and the "character string" displayed in the printer setting value information table. However, in the printer driver 303, a plurality of languages is generally displayed. In a second exemplary embodiment, when a plurality of languages is supported, a printer driver 303 is referred to as a multilanguage printer driver 303, and main differences from the first exemplary embodiment are described.

Figure 15:
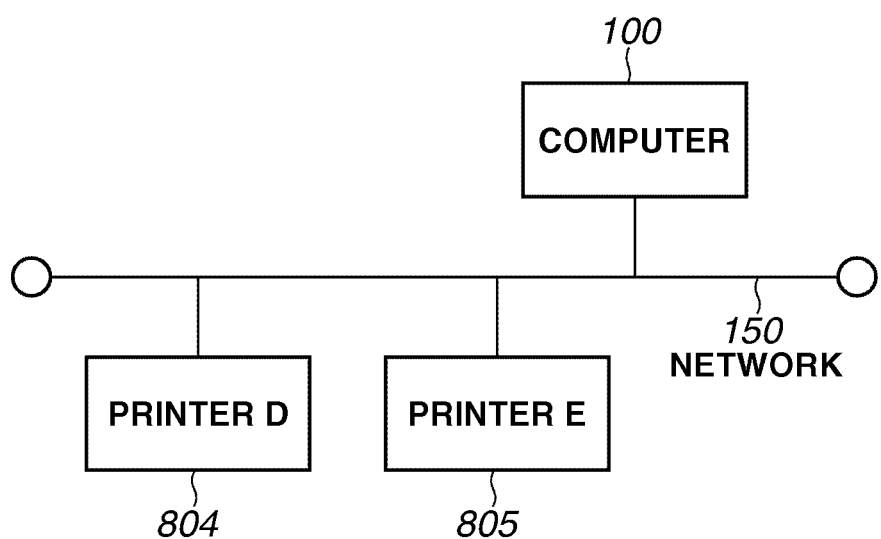
FIG. 15 illustrates an example of a configuration of a printing system.

FIG. 15 illustrates a configuration of a printing system according to the present exemplary embodiment. A printer D804 and a printer E805 similar in configuration to the printer 200, and a computer 100 are connected to a network 150.

FIGS. 16A and 16B illustrate examples of setting value information management tables relating to "sheet type" managed by the multilanguage printer driver 303. In FIG. 16A, the setting value information management table includes "conversion processing type" and "ID". In FIG. 16B, the setting value information management table includes "ID", "language", "character string", and "update version". The example of a format including the two tables is described. However, a format where correspondence can be set among "conversion processing type", "ID", "language", "character string", and "update version" can be employed when necessary. The "language" is an example of type information indicating a language type of a character string displayed on the print setting screen.

FIG. 17A illustrates an example of a printer setting value information table stored in an auxiliary storage device 203 of the printer D804. FIG. 17B illustrates an example of a printer setting value information table stored in an auxiliary storage device 203 of the printer E805. A difference from the first exemplary embodiment is storage of information in a plurality of languages. In FIG. 17A, character string information of "Japanese", "English", and "French" is stored. In FIG. 17B, character string information of "Japanese", "English", and "simplified Chinese" is stored.

Referring to a flowchart of FIG. 11, updating of a setting value information management table relating to "sheet type" by the multilanguage printer driver 303 is described. Differences from the first exemplary embodiment will be described.

In step S1106, a table update unit 307 acquires data of each line of a printer setting value information table acquired from a printer, and checks whether "character string" is included in the setting value information management table for each of "language" and "character string" contained in the acquired data. When the table update unit 307 determines that the character string is included (YES in step S1106), the processing proceeds to step S1108. When not included (NO in step S1106), in step S1107, the acquired data (ID, language, character string, or version) is added to the setting value information management table, and the processing proceeds to step S1110.

In step S1108, the table update unit 307 compares the "version" included in the acquired printer setting value information table with the "update version" of the "ID" and the "language" of the setting value information management table. When the table update unit 307 determines that the former "version" is newer, the processing proceeds to step S1109. When the latter "update version" is newer, or when the former "version" and the latter "update version" are similar, the processing proceeds to step S1110. In step S1109, the table update unit 307 updates the "character string" and the "update version" for the "ID" and the "language" of the setting value information management table. Other processes are similar to those of the first exemplary embodiment, and thus description thereof is omitted.

FIG. 18 illustrates a setting value information management table updated by using the printer setting value information tables illustrated in FIGS. 17A and 17B, the printer setting value information tables having been acquired from the printer D804 and the printer E805 through communication therewith. In the setting value information management table illustrated in FIG. 18, as compared with that illustrated in FIG. 16B, character strings for "Japanese", "English", and "French" of ID "3" have been updated based on the printer setting value information table illustrated in FIG. 17A. Based on the printer setting value information tables illustrated in FIGS. 17A and 17B, sheet types of ID "4" have been added to "Japanese", "English", "French", and "simplified Chinese". In FIG. 16A, data of conversion processing type "C" and ID "4" are added. However, these data are not illustrated.

Next, differences in print setting dialog displaying of the multilanguage printer driver 303, from the first exemplary embodiment are described. The multilanguage printer driver 303 acquires, by referring to setting information of a used language set in the printing system by the user, a character string of the language designated by the user from the setting value information management table illustrated in FIG. 18 based on the setting information, and displays the acquired character string in the print setting dialog. When there is no character string set in the printing system by the user corresponding to the used language in the setting value information management table, a character string of English is displayed. When no character string is present in the setting value information management table, the user can be permitted to select a language to be displayed beforehand.

Other Exemplary Embodiments

The present invention can also be achieved by executing processing below. Software (programs) for realizing the exemplary embodiments is supplied to a system or an apparatus via a network or various storage media. A computer (or CPU or microprocessing unit (MPU)) of the system or the apparatus reads the programs to execute them.

According to the exemplary embodiment, a character string displayed on a print setting screen can be updated more appropriately.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-039254 filed Feb. 24, 2010, which is hereby incorporated by reference herein in its entirety.

What is claimed is:

1. An information processing apparatus comprising:
a determination unit configured to determine whether setting value data corresponding to the identification information of the received printer data is present in a storage unit when printer data in which identification information to identify a setting value on a print setting screen, character string information indicating a character string corresponding to the setting value displayed on the print setting screen, and version information indicating an old/new state of the character string information are associated with each other, is received from a printer which can communicate;
a storage unit configured to store setting value data containing the identification information, the character string information, and the version information in the storage unit when the determination unit determines that the setting value data corresponding to the identification information of the printer data is not present in the storage unit;
an update unit configured to update the character string information and the version information of the setting value data with those of the printer data when the determination unit determines that the setting value data corresponding to the identification information of the printer data is present in the storage unit, and when the version information of the printer data is newer than that of the setting value data;
wherein the printer data received from the printer which can communicate is further associated with conversion processing type information indicating a type of conversion of image data into print data;
the determination unit determines whether setting value data corresponding to the identification information of the received printer data is present in the storage unit when the printer data in which the identification information, the character string information, the version information and the conversion processing type information are associated with each other, is received; and the storage unit stores setting value data containing the identification information, the character string information, the version information, and the conversion processing type information in the storage unit when the determination unit determines that the setting value data corresponding to the identification information of the printer data is not present;

a display unit configured to display a character string of character string information of the setting value data corresponding to the identification information and a character string of character string information of the setting value data containing the same conversion processing type information, on the print setting screen when identification information of a setting value settable by the printer is received from the printer which can communicate and which is designated based on a user's print setting operation, and setting value data containing the same conversion processing type information as that of setting value data corresponding to the identification information is present in the storage unit; and a transmission unit configured to read setting value data containing the same conversion processing type information as that of setting value data corresponding to the selected identification information from the storage unit, and transmit identification information of the read setting value data to the printer when the identification information received from the printer includes no identification information corresponding to a character string selected on the print setting screen by a user.

2. The information processing apparatus according to claim 1, wherein:

the printer data received from the printer which can communicate is further associated with type information indicating a type of a language of the character string displayed on the print setting screen;

the determination unit determines whether setting value data corresponding to the identification information and the language of the received printer data is present in the storage unit when the printer data in which the identification information, the character string information, the version information, and the type information are associated with each other, is received from the printer which can communicate;

the storage unit stores setting value data containing the identification information, the character string information, the version information, and the type information, in the storage unit when the determination unit determines that the setting value corresponding to the identification information and the type information of the printer data is not present in the storage unit; and the update unit updates the character string information and the version information of the setting value data with those of the printer data when the determination unit determines that the setting value data corresponding to the identification information and the type information of the printer data is present in the storage unit, and when the version information of the printer data is newer than that of the setting value data.

3. An information processing method executed by an information processing apparatus, comprising:

determining whether setting value data corresponding to the identification information of the received printer data is present in a storage unit when printer data in which identification information to identify a setting value on a print setting screen, character string information indicating a character string corresponding to the setting value displayed on the print setting screen, and version information indicating an old/new state of the character string information are associated with each other, is received from a printer which can communicate;

storing setting value data containing the identification information, the character string information, and the version information in the storage unit when it is determined that the setting value data corresponding to the identification information of the printer data is not present in the storage unit; and updating the character string information and the version information of the setting value data with those of the printer data when it is determined that the setting value data corresponding to the identification information of the printer data is present in the storage unit, and when the version information of the printer data is newer than that of the setting value data;

wherein the printer data received from the printer which can communicate is further associated with conversion processing type information indicating a type of conversion of image data into print data;

determining whether setting value data corresponding to the identification information of the received printer data is present in the storage unit when the printer data in which the identification information, the character string information, the version information and the conversion processing type information are associated with each other, is received; and the storage unit stores setting value data containing the identification information, the character string information, the version information, and the conversion processing type information in the storage unit when determining that the setting value data corresponding to the identification information of the printer data is not present;

displaying a character string of character string information of the setting value data corresponding to the identification information and a character string of character string information of the setting value data containing the same conversion processing type information, on the print setting screen when identification information of a setting value settable by the printer is received from the printer which can communicate and which is designated based on a user's print setting operation, and setting value data containing the same conversion processing type information as that of setting value data corresponding to the identification information is present in the storage unit; and reading setting value data containing the same conversion processing type information as that of setting value data corresponding to the selected identification information from the storage unit, and transmit identification information of the read setting value data to the printer when the identification information received from the printer includes no identification information corresponding to a character string selected on the print setting screen by a user.

4. A non-transitory storage medium for storing a program that causes a computer to function as:

a determination unit configured to determine whether setting value data corresponding to the identification information of the received printer data is present in a storage unit when printer data in which identification information to identify a setting value on a print setting screen, character string information indicating a character string corresponding to the setting value displayed on the print setting screen, and version information indicating an old/new state of the character string information are associated with each other, is received from a printer which can communicate;

a storage unit configured to store setting value data containing the identification information, the character string information, and the version information in the storage unit when the determination unit determines that the setting value data corresponding to the identification information of the printer data is not present in the storage unit;

an update unit configured to update the character string information and the version information of the setting value data with those of the printer data when the determination unit determines that the setting value data corresponding to the identification information of the printer data is present in the storage unit, and when the version information of the printer data is newer than that of the setting value data;

wherein the printer data received from the printer which can communicate is further associated with conversion processing type information indicating a type of conversion of image data into print data;

the determination unit determines whether setting value data corresponding to the identification information of the received printer data is present in the storage unit when the printer data in which the identification information, the character string information, the version information and the conversion processing type information are associated with each other, is received; and the storage unit stores setting value data containing the identification information, the character string information, the version information, and the conversion processing type information in the storage unit when the determination unit determines that the setting value data corresponding to the identification information of the printer data is not present;

a display unit configured to display a character string of character string information of the setting value data corresponding to the identification information and a character string of character string information of the setting value data containing the same conversion processing type information, on the print setting screen when identification information of a setting value settable by the printer is received from the printer which can communicate and which is designated based on a user's print setting operation, and setting value data containing the same conversion processing type information as that of setting value data corresponding to the identification information is present in the storage unit; and a transmission unit configured to read setting value data containing the same conversion processing type information as that of setting value data corresponding to the selected identification information from the storage unit, and transmit identification information of the read setting value data to the printer when the identification information received from the printer includes no identification information corresponding to a character string selected on the print setting screen by a user.

* * * * *